Patented June 18, 1929.

1,717,869

UNITED STATES PATENT OFFICE.

SAUL BLUMENTHAL, OF BROOKLYN, NEW YORK.

PROCESS OF REMOVING BLEACHING CHEMICALS FROM FRUIT OR THE LIKE.

No Drawing.   Application filed December 7, 1926.   Serial No. 153,218.

Fruits such as raisins, cherries, apples, pears, pineapples, etc., for shipment over seas or generally for preservation purposes are usually treated with a bleaching chemical substance as calcium bisulphite, sodium and potassium bisulphite, sulphurous acid, burning sulphur or the like. Under the pure food laws of the different States of this country, the food thus bleached is not allowed to be sold for consumption until the bleaching chemical has been either wholly or partly removed from the fruit according to the laws of the particular State. Hitherto, the removing of the bleaching chemical has been done by repeated washing of the fruit in cold water. This is a very long and tedious process, the treatment extending over a period of from 4 to 10 days.

The object of my invention is to provide a process whereby the removal of the bleaching chemical from the fruit either wholly or partly according to the legal requirement can be done more effectively and in a much shorter period of time.

I have found that a fruit, previously bleached as hereinbefore stated, can be quickly freed from the bleaching substance if it is treated with an oxidizing salt in warm water. The bleaching chemical will be oxidized to a sulphate salt within a period of a few hours, that easily dissolves in the warm water and can be drained off.

To carry out my process, I dissolve a comparatively small quantity of oxidizing salt such as, ammonium persulphate, sodium perborate, benzoyl peroxide, sodium peroxide, or potassium chlorate in warm water, pour this solution into a container holding the fruit, then add warm water until the fruit is entirely submerged. The fruit is left in this solution a few hours. During this period it is repeatedly stirred. After draining off the liquid, the fruit is washed off in fresh water.

Thus, for example, ½ lb. of ammonium persulphite dissolved in warm water may be sufficient for the treatment of about 250 lbs. of bleached fruit.

If the sulphur dioxide is to be only partly removed the fruit during its treatment is repeatedly examined at hour intervals until the desired percentage of sulphur dioxide is reached.

The sulphuric acid resulting from the oxidation of the sulphur dioxide by the oxidizing salt is liable to affect the fruit during treatment. To remedy this, it is advantageous to use, in addition to an oxidizing salt, an equal proportion of alkaline salt, such as sodium bicarbonate. The alkaline salt reacting with the sulphuric acid forms a sodium salt and carbonic acid gas which have no injurious effect on the fruit and are drained off when the desired percentage of the bleaching substance is removed.

While hot water is preferable, cold water and in fact any water containing substance such as sugar syrup or the like may be used.

What I claim is:—

1. A process of removing from fruit sulphur dioxide for bleaching the same, consisting in submerging the fruit in a solution of potassium chlorate and bicarbonate of soda, stirring the fruit therein and after draining off the liquid washing the fruit in fresh water.

2. A process of removing from fruit sulphur dioxide for bleaching the same, consisting in submerging the fruit in a solution of potassium chlorate, stirring the fruit therein and after draining off the liquid washing the fruit in fresh water.

In testimony whereof I affix my signature.

SAUL BLUMENTHAL.